(12) United States Patent
Cymbal et al.

(10) Patent No.: US 11,226,009 B2
(45) Date of Patent: Jan. 18, 2022

(54) STEERING SHAFT ASSEMBLY

(71) Applicant: STEERING SOLUTIONS IP HOLDING CORPORATION, Saginaw, MI (US)

(72) Inventors: William D. Cymbal, Freeland, MI (US); Carl R. Castanier, Saginaw, MI (US); Mike E. Partyka, Saginaw, MI (US); William J. Knight, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 628 days.

(21) Appl. No.: 16/030,218

(22) Filed: Jul. 9, 2018

(65) Prior Publication Data

US 2020/0011381 A1 Jan. 9, 2020

(51) Int. Cl.
*F16D 3/38* (2006.01)
*F16D 1/08* (2006.01)

(52) U.S. Cl.
CPC ........... *F16D 3/387* (2013.01); *F16D 1/0847* (2013.01); *Y10T 403/7188* (2015.01)

(58) Field of Classification Search
CPC .......... F16D 1/06; F16D 1/0864; F16D 1/112; F16D 1/116; F16D 3/387; Y10S 464/905; Y10T 403/4614; Y10T 403/4617; Y10T 403/535; Y10T 403/7182; Y10T 403/7188

USPC ........ 403/235, 236, 290, 398, 399; 464/134, 464/135, 905

See application file for complete search history.

(56) References Cited

U.S. PATENT DOCUMENTS

| | | | | |
|---|---|---|---|---|
| 4,576,504 A | * | 3/1986 | Hartman | F16D 1/0894 403/318 |
| 4,579,477 A | * | 4/1986 | Hartman | F16D 1/0894 403/324 |
| 4,862,760 A | * | 9/1989 | Kuwahara | F16D 1/0894 74/473.3 |
| 5,318,375 A | * | 6/1994 | Entrup | F16D 1/0894 403/322.1 |
| 5,490,751 A | * | 2/1996 | Courgeon | F16D 1/0864 411/368 |
| 6,443,650 B2 | | 9/2002 | Ikeda | |
| 7,461,996 B2 | * | 12/2008 | Kinme | F16D 1/0864 403/236 |
| 7,513,709 B2 | * | 4/2009 | Shimada | F16D 1/0864 403/399 |
| 9,581,205 B2 | * | 2/2017 | Knoth | F16D 1/0864 |

* cited by examiner

*Primary Examiner* — Josh Skroupa
(74) *Attorney, Agent, or Firm* — Dickinson Wright PLLC

(57) ABSTRACT

A shaft assembly includes a yoke having a yoke body having an exterior surface extending between a first end and a second end along a first axis. The yoke body defines a first bore and a second bore. The first bore extends along the first axis between the first end and the second end. The second bore extends partially across the yoke body along a second axis that is disposed transverse to the first axis. The second bore at least partially intersects the first bore.

9 Claims, 2 Drawing Sheets

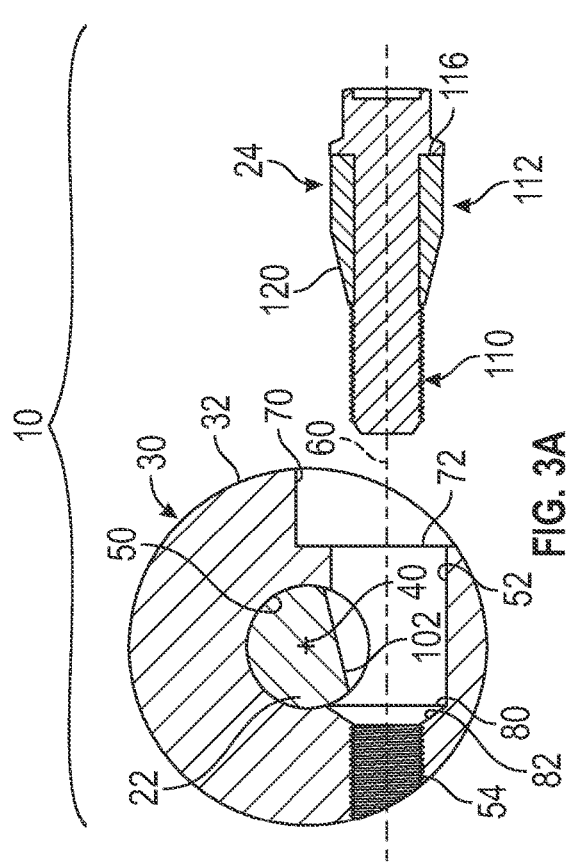
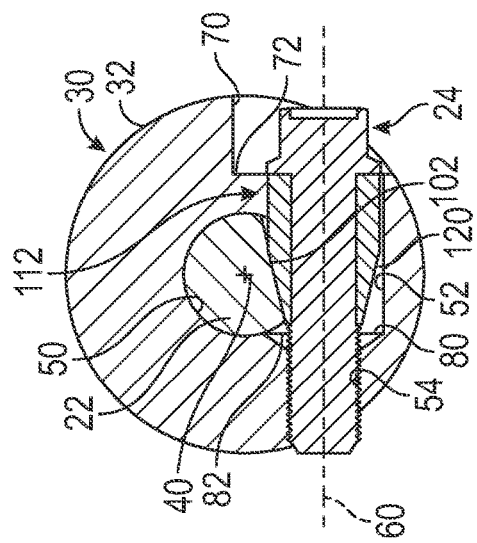
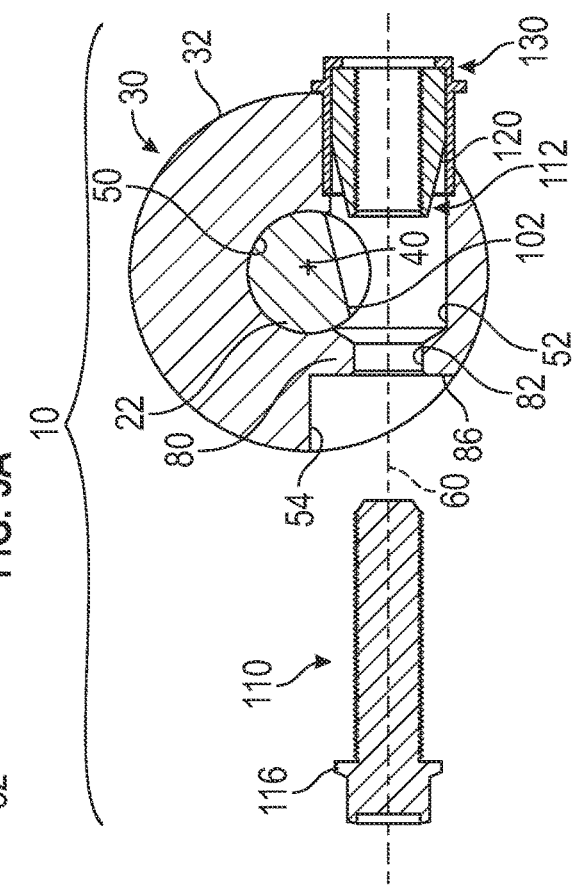
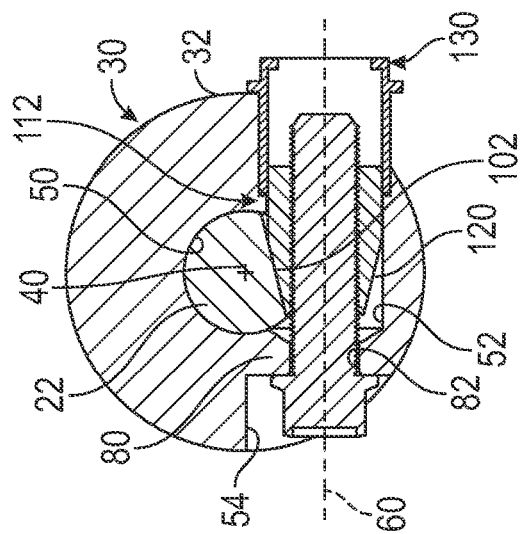

STEERING SHAFT ASSEMBLY

BACKGROUND

A vehicle may be provided with a steering column having a clamp yoke that aids in the transmission of steering torque to a steering mechanism of the vehicle. A bolt may be inserted into the clamp yoke that applies a force to the clamp yoke to deform the clamp yoke to operatively connect the clamp yoke to a steering shaft or pinion shaft.

SUMMARY

Disclosed is a shaft assembly that includes a yoke having a yoke body having an exterior surface extending between a first end and a second end along a first axis. The yoke body defines a first bore and a second bore. The first bore extends along the first axis between the first end and the second end. The second bore extends partially across the yoke body along a second axis that is disposed transverse to the first axis. The second bore at least partially intersects the first bore.

Also disclosed is a shaft assembly that includes a yoke having a yoke body having an exterior surface extending between a first end and a second end along a first axis. The yoke body defines a first bore, a second bore, and a third bore. The first bore extends along the first axis from the first end to the second end. The second bore extends only partially across the yoke body along a second axis that is disposed transverse to the first axis. The second bore at least partially intersects the first bore. The third bore is disposed opposite the second bore and extends from the exterior surface towards the second bore along the second axis.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIGS. 3A and 3B are partial section views of the shaft assembly with a fastener assembly not installed and installed; and FIGS. 4A and 4B are partial section views of the shaft assembly with a fastener assembly not installed and installed.

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
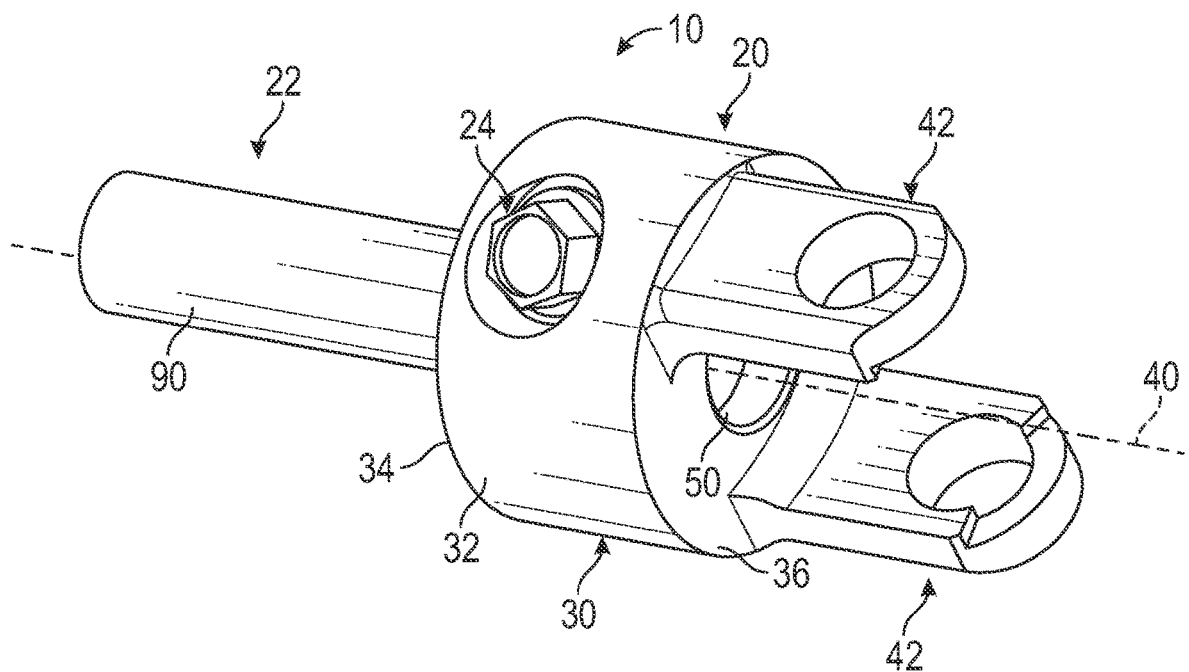
FIG. 1 is a perspective view of a shaft assembly.

Referring to FIG. 1, a shaft assembly 10 is shown. The shaft assembly 10 may be a steering shaft assembly that may connect various components of a steering system. The shaft assembly 10 includes a yoke 20, a shaft 22, and a fastener assembly 24. The yoke 20 is secured to the shaft assembly 10 by the fastener assembly 24 that provides an improved yoke 20 to shaft 22 attachment while also allowing the fastener assembly 24 to be oriented in almost any radial location of the yoke 20.

Figure 2:
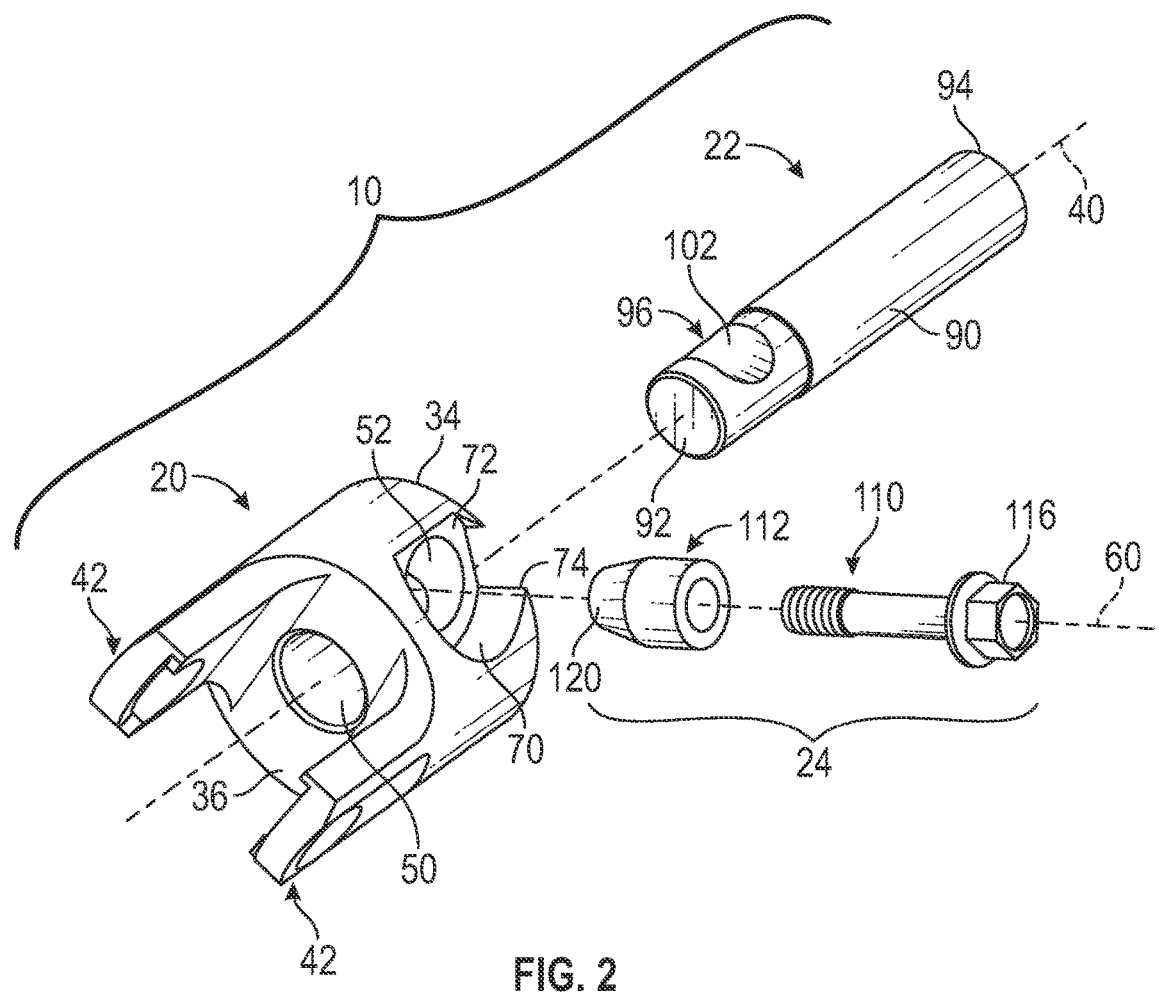
FIG. 2 is a disassembled view of the shaft assembly.

Referring to FIGS. 1 and 2, the yoke 20 includes a yoke body 30 having an exterior surface 32 that extends between a first end 34 and a second end 36 along a first axis 40. The yoke body 30 may have a generally cylindrical shape, however other shapes or cross-sectional forms are also contemplated. A pair of yoke ears 42 are spaced apart from each other and extend away from the second end 36 of the yoke body 30.

The yoke 20 defines a first bore 50, a second bore 52, and a third bore 54.

The first bore 50 extends along the first axis 40 between the first end 34 of the yoke body 30 and the second end 36 of the yoke body 30. The first bore 50 may extend completely through the yoke body 30 or may be a blind hole or blind bore.

The second bore 52 extends at least partially across the yoke body 30 along a second axis 60. In the embodiments shown, the second bore 52 extends only partially across the yoke body 30 and does not extend completely across the yoke body 30. In other embodiments, the second bore 52 may extend completely across the yoke body 30 along the second axis 60. The second axis 60 is disposed generally transverse to the first axis 40. The second bore 52 at least partially intersects the first bore 50, as shown in FIGS. 3A, 3B, 4A, and 4C.

Referring to FIGS. 2, 3A, and 3B, a counterbore 70 extends from the exterior surface 32 of the yoke body 30, across the yoke body 30, towards the second bore 52 along the second axis 60. A flat 72 radially extends, relative to the second axis 60, between the second bore 52 and the counterbore 70. A notch 74 may be defined by the yoke body 30, as shown in FIG. 2. The notch 74 extends from the second end 36 of the yoke body 30 through the counterbore 70 towards the second end 36 of the yoke body 30.

Referring to FIGS. 3A and 3B, the third bore 54 is disposed opposite the counterbore 70. The third bore 54 extends from the exterior surface 32 of the yoke body 30, across the yoke body 30, towards the second bore 52, along the second axis 60. The third bore 54 defines or is provided with a plurality of threads, such that the third bore 54 is a threaded bore.

Referring to FIGS. 4A and 4B, the third bore 54 is disposed opposite the second bore 52. The third bore 54 extends from the exterior surface 32 of the yoke body 30, across the yoke body 30, towards the second bore 52 along the second axis 60.

Referring to FIGS. 3A, 3B, 4A, and 4B, the yoke body 30 defines a stop wall 80 that defines an opening 82. The stop wall 80 is disposed between the second bore 52 and the third bore 54. The opening 82 of the stop wall 80 extends completely through the stop wall 80 along the second axis 60. The opening 82 of the stop wall 80 may not be provided with threads. As shown in FIGS. 4A and 4B, a flat 86 radially extends, relative to the second axis 60, between the third bore 54 and the opening 82 of the stop wall 80.

The radial location of the second bore 52 and the third bore 54 along the second axis 60 may be infinitely varied or oriented in any radial location in relation to the yoke ears 42. This enables the optimal position of the bores for installation access of the fastener assembly 24. Furthermore, the variation of the radial location of the second bore 52 and the third bore 54 along the second axis 60 also permits the tuning of an input torque curve.

Referring to FIGS. 1 and 2, the shaft 22 includes an outer surface 90 that extends between a first shaft end 92 and a second shaft end 94 along the first axis 40. The first shaft end 92 is arranged to extend into the first bore 50. An end surface of the shaft 22 that is disposed at the first shaft end 92 may be disposed parallel to the second end 36 of the yoke body 30. The end surface of the shaft 22 may be disposed parallel to and/or coplanar with the second end 36 of the yoke body 30.

The outer surface 90 of the shaft 22 defines a notch 96 that extends from the outer surface 90 towards the first axis 40. The notch 96 is disposed proximate the first shaft end 92. The notch 96 may be defined by a portion of the shaft 22 having a reduced cross-sectional area as compared to the remainder of the shaft 22. The reduced cross-sectional area of the shaft 22 is received within the first bore 50.

The notch 96 includes a surface 102 that is inclined and/or declined relative to at least one of the first axis 40 and the second axis 60. The surface 102 may be a tapered surface that tapers towards the first axis 40.

The fastener assembly 24 extends into the second bore 52 and/or the third bore 54 along the second axis 60. The fastener assembly 24 is provided with a conical wedge or tapered surface that self-aligns the fastener assembly 24 with the notch 96 of the shaft 22 to facilitate the securing of the yoke 20 to the shaft 22. The conical wedge or tapered surface of the fastener assembly 24 inhibits bolt bending as compared to some current designs.

The fastener assembly 24 includes a fastener 110 and a sleeve 112. The fastener 110 may be a bolt having a fastener head 116. The sleeve 112 may be provided with the fastener 110 or may be provided separately from the fastener 110.

Referring to FIGS. 3A and 3B, the sleeve 112 is disposed about a shank of the fastener 110 and abuts the fastener head 116. An outer surface of the sleeve 112 defines the conical wedge or tapered surface 120 that engages the surface 102 of the notch 96.

The fastener 110 having the sleeve 112 disposed about the fastener 110, extends through the counterbore 70, the second bore 52, and through the opening 82 of the stop wall 80 along the second axis 60 and extends into the third bore 54 along the second axis 60, as shown in FIGS. 3A and 3B. The fastener 110 engages the threads of the third bore 54. The fastener head 116 is disposed on or engages the flat 72, as shown in FIG. 3B.

Referring to FIGS. 4A and 4B, the sleeve 112 may be provided separately from the fastener 110. The sleeve 112 may be inserted into the second bore 52 and held in place by a retainer 130. The retainer 130 that retains the sleeve 112 extends into the second bore 52 along the second axis 60. The retainer 130 holds the sleeve 112 within the second bore 52 during the assembly process.

The fastener 110 extends through the third bore 54, through the opening 82 of the stop wall 80, and extends into the second bore 52. The sleeve 112 is provided with or defines a plurality of inner threads. Threads of the faster 110 engage the plurality of inner threads of the sleeve 112. The rotation of the fastener 110 about the second axis 60 within the sleeve 112, in a first direction, draws the sleeve 112 from the retainer 130 along the second axis 60 towards the stop wall 80 and/or the fastener head 116. The drawing of the sleeve 112 from the retainer 130 by the rotation of the fastener 110 causes the tapered surface 120 of the sleeve 112 to engage the surface 102 of the notch 96 of the shaft 22.

The fastener head 116 is disposed on or engages the flat 86, as shown in FIG. 4B. The retainer 130 may then be removed from the second bore 52.

The arrangement of the shaft assembly 10 facilitates the variation of the position of the fastener assembly 24 relative to the yoke ears 42 while simultaneously tuning the position of the shaft assembly 10 on the input torque curve. The arrangement of the shaft assembly 10 also inhibits or reduces the potential of the yoke ears 42 from bending or deforming while also improving the integration or assembly of the shaft assembly 10.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

Having thus described the invention, it is claimed:

1. A shaft assembly, comprising:
a yoke having a yoke body having an exterior surface extending between a first end and a second end along a first axis, the yoke body defining:
a first bore that extends along the first axis between the first end and the second end, and
a second bore that extends partially across the yoke body along a second axis that is disposed transverse to the first axis, the second bore at least partially intersects the first bore,
a shaft having an outer surface extending between a first shaft end that extends into the first bore and a second shaft end along the first axis,
the shaft defining a notch defined by the shaft that is disposed proximate the first shaft end and extends from the outer surface towards the first axis,
wherein the notch includes a surface that is linear and at least one of inclined and declined relative to the second axis;
the yoke body defining a third bore that is disposed opposite a counterbore and extends from the exterior surface towards the second bore along the second axis,
the yoke body further defining a stop wall that is disposed between the second bore and the third bore,
a fastener assembly that extends through the second bore, through the stop wall, into the third bore, and at least partially engages the notch, and
wherein the third bore is threaded and the fastener assembly is at least partially threaded into the third bore.

2. The shaft assembly of claim 1, wherein the yoke body defines the counterbore that extends from the exterior surface towards the second bore along the second axis.

3. The shaft assembly of claim 2, wherein a flat radially extends, relative to the second axis, between the second bore and the counterbore.

4. The shaft assembly of claim 1, the fastener assembly includes a tapered surface that engages the surface of the notch.

5. A shaft assembly, comprising:
- a yoke having a yoke body having an exterior surface extending between a first end and a second end along a first axis, the yoke body defining:
  - a first bore that extends along the first axis from the first end to the second end,
  - a second bore that extends only partially across the yoke body along a second axis that is disposed transverse to the first axis, the second bore at least partially intersects the first bore,
  - a third bore that is disposed opposite the second bore and extends from the exterior surface towards the second bore along the second axis,
  - a stop wall defining an opening and that is disposed between the second bore and the third bore,
- a fastener that extends through the third bore, through the stop wall, and into the second bore along the second axis,
- a sleeve that extends into the second bore along the second axis, and
- wherein the fastener extends into the sleeve.

6. The shaft assembly of claim 5, further comprising:
- a shaft having an outer surface extending between a first shaft end and a second shaft end along the first axis, the first shaft end extending into the first bore.

7. The shaft assembly of claim 5, wherein the sleeve includes a tapered surface that is at least one of inclined and declined relative to the second axis.

8. The shaft assembly of claim 7, wherein the tapered surface of the sleeve engages the shaft.

9. The shaft assembly of claim 5, wherein a retainer locates the sleeve in the second bore.

\* \* \* \* \*